US012744026B2

(12) United States Patent
Sakamoto et al.

(10) Patent No.: US 12,744,026 B2
(45) Date of Patent: Sep. 22, 2026

(54) ON-VEHICLE SOUND CONTROL SYSTEM

(71) Applicant: HONDA MOTOR CO., LTD., Tokyo (JP)

(72) Inventors: Kosuke Sakamoto, Saitama (JP); Takuma Maesaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 128 days.

(21) Appl. No.: 18/815,069

(22) Filed: Aug. 26, 2024

(65) Prior Publication Data

US 2025/0078801 A1 Mar. 6, 2025

(30) Foreign Application Priority Data

Sep. 5, 2023 (JP) ................................ 2023-143604

(51) Int. Cl.
*G10K 11/178* (2006.01)

(52) U.S. Cl.
CPC .. *G10K 11/17825* (2018.01); *G10K 11/17879* (2018.01); *G10K 2210/12821* (2013.01); *G10K 2210/3011* (2013.01); *G10K 2210/3026* (2013.01); *G10K 2210/3027* (2013.01); *G10K 2210/3028* (2013.01); *G10K 2210/3056* (2013.01)

(58) Field of Classification Search
CPC .............. H03H 21/0012; H03H 21/008; B60R 16/023; G01S 15/93; G10K 11/178; G10K 11/17825; G10K 11/17879; G06F 17/15
See application file for complete search history.

(56) References Cited

U.S. PATENT DOCUMENTS

| | | | | |
|---|---|---|---|---|
| 9,668,046 | B2 | 5/2017 | Mizuno | |
| 11,335,314 | B2 | 5/2022 | Tachi et al. | |
| 11,622,195 | B2 | 4/2023 | Tachi et al. | |
| 2010/0124336 | A1* | 5/2010 | Shridhar .......... | G10K 11/17885 381/71.4 |
| 2020/0105242 | A1* | 4/2020 | Griffin ............. | G10K 11/17823 |

FOREIGN PATENT DOCUMENTS

| | | | |
|---|---|---|---|
| CN | 113936633 | A | 1/2022 |
| JP | H03203493 | A | 9/1991 |
| JP | 2022013122 | A | 1/2022 |
| JP | 7262899 | B2 | 4/2023 |
| WO | 2014207990 | A1 | 12/2014 |
| WO | 2021157614 | A1 | 8/2021 |

OTHER PUBLICATIONS

Notice of Reasons for Refusal for Japanese Patent Application No. 2023-143604 dated Mar. 5, 2025; 11 pp.

* cited by examiner

*Primary Examiner* — Rasha S Al Aubaidi
(74) *Attorney, Agent, or Firm* — Armstrong Teasdale LLP

(57) ABSTRACT

An on-vehicle sound control system includes: a speaker configured to output canceling sound for canceling noise; a controller configured to control the speaker; and a distance estimation device configured to estimate a distance between the speaker and an ear of an occupant. The controller includes a control filter configured to generate a control signal for controlling the speaker and a control signal correction unit configured to correct the control signal based on the distance and to output a corrected control signal, and the controller controls the speaker based on the corrected control signal.

9 Claims, 10 Drawing Sheets

(B) forward displacement (A) normal position (C) rearward displacement

| | | | |
|---|---|---|---|
| acoustic characteristic | decrease | reference | increase |
| correction coefficient G | increase | reference = 1 | decrease |

ON-VEHICLE SOUND CONTROL SYSTEM

TECHNICAL FIELD

The present invention relates to an on-vehicle sound control system.

BACKGROUND ART

In recent years, taking into account people in vulnerable situations such as the elderly and children among traffic participants, efforts have been actively made to provide access to sustainable transportation systems for such people. Toward its realization, research and development for further improving the safety and convenience of traffic through development of vehicle comfort are attracting attention.

To improve vehicle comfort, it is desired to reduce the noise inside the vehicle. Therefore, research and development of an active noise control device, which reduces noise by generating canceling sound that is in opposite phase with the noise and making the canceling sound interfere with the noise, are actively conducted.

Conventionally, there is known an active noise control system that includes an adaptive filter to which a noise signal is inputted, an adaptive algorithm execution unit for adaptively updating the transfer function of the adaptive filter, and a speaker for outputting noise cancellation sound according to a noise canceling signal outputted from the adaptive filter. For example, JP7262899B2 discloses an active noise control system in which multiple auxiliary filters for which transfer functions are respectively set corresponding to positions of the occupant's ears (noise cancellation positions) for different seat positions are provided, the microphone output (microphone error signal) outputted from the microphone is corrected by using the output of the auxiliary filter selected depending on the occupant's ear position, and thereafter the adaptive algorithm execution unit adaptively updates the transfer function of the adaptive filter by using the corrected microphone error signal.

However, in the system disclosed in JP7262899B2, it is necessary to provide multiple auxiliary filters corresponding to different ear positions, and thus, a large amount of memory capacity and a large calculation amount are necessary, which leads to an expensive controller and complex control. Further, this system updates the transfer function of the adaptive filter by using the error signal corrected by the auxiliary filter for the difference between the transfer function from the noise source to the microphone and the transfer function from the noise source to the occupant's ear position. Therefore, when the seat position or the occupant's ear position changes, it takes time for the transfer function of the adaptive filter to become an appropriate value, whereby control of the canceling sound to follow the movement of the seat position is slow, and the silencing effect while the control is delayed is low. As described above, technology for directly controlling the noise canceling signal in response to a change of the distance from the speaker to the occupant's ear has not been proposed.

SUMMARY OF THE INVENTION

In view of the foregoing background, a primary object of the present invention is to directly correct a control signal for noise cancellation in response to a change of the distance from the speaker to the occupant's ear, thereby to simplify the control and to quickly control the canceling sound following the change of the ear position. Furthermore, the present invention aims to contribute to development of a sustainable transportation system.

To achieve the above object, one aspect of the present invention provides an on-vehicle sound control system (1), comprising: a speaker (21) configured to output canceling sound (y) for canceling noise (d); a controller (23) configured to control the speaker; and a distance estimation device (18) configured to estimate the distance (L) between the speaker and an ear of an occupant, wherein the controller comprises a control filter (31) configured to generate a control signal (u) for controlling the speaker and a control signal correction unit (32) configured to correct the control signal based on the distance and to output a corrected control signal (u'), and the controller controls the speaker based on the corrected control signal.

According to the above aspect, since the control signal is directly corrected based on the distance from the speaker to the occupant's ear, the control is simple and the canceling sound can be controlled quickly to follow the change of the occupant's ear position.

Preferably, the control signal correction unit (32) is provided with a correction coefficient (G) such that the larger the distance (L) is, the larger an amplitude of the corrected control signal becomes, and the control signal correction unit corrects the control signal (u) with the correction coefficient.

When the distance between the speaker and the occupant's ear (hereinafter, may be referred to as the relative distance) becomes larger (when the ear moves away from the speaker), the canceling sound that reaches the ear from the speaker becomes smaller. According to the above aspect, the reduction of the canceling sound can be corrected with a simple method of correcting the control signal with the correction coefficient, and thus, the memory capacity and the calculation amount of the controller can be reduced compared to the case where multiple auxiliary filters are provided.

Preferably, the on-vehicle sound control system further comprises an error microphone (22) configured to generate an error signal (e) from the noise (d) and the canceling sound (y), wherein the controller (23) further comprises an adaptive update unit (38) configured to perform adaptive update of the control filter (31) based on the error signal and an update determination unit (39) configured to determine, based on the distance (L), whether the update by the adaptive update unit may be performed, and the adaptive update unit performs the update only when the update determination unit permits the update.

If the adaptive filter is updated when the head position of the occupant changes due to temporary change of the posture of the occupant or by the shaking of the vehicle, it takes time for the adaptive filter to return to the original state by the update after the head returns to the usual position. According to the above aspect, since the update determination unit determines, based on the relative distance, whether the update may be performed, learning due to unnecessary adaptive update is suppressed in cases such as when the occupant's ear position changes significantly. Also, since the controller executes a simple control method of determining whether the update may be permitted based on the ear position (relative distance) and stopping/resuming the update according to the determination result, the memory capacity and the calculation amount of the controller can be reduced compared to the case where the auxiliary filters are used.

Preferably, the control signal correction unit (32) corrects the control signal (u) only when the update determination unit (39) does not permit the update and does not correct the control signal when the update determination unit permits the update.

If the control signal correction unit corrects the control signal based on the relative distance during the adaptive update of the control filter, convergence of the adaptive filter is delayed. According to the above aspect, since the control signal correction unit does not correct the control signal during the update of the control filter, convergence of the adaptive filter is fast.

Preferably, the control signal correction unit (32) corrects the control signal (u) with a correction coefficient (G) set depending on the distance, the update determination unit (39) permits the update when the distance (L) is in a predetermined usual range (A-B), and the control signal correction unit (32) does not correct the control signal when the distance is in the usual range.

According to the above aspect, since the control signal can be corrected simply with a correction coefficient, the memory capacity and the calculation amount of the controller can be reduced compared to the case where multiple auxiliary filters are provided.

Preferably, the correction coefficient (G) monotonically increases with an increase of the distance (L) and is set to 1 when the distance is in the usual range (A-B), and the control signal correction unit (32) does not correct the control signal by maintaining the correction coefficient to 1 when the distance is in the usual range.

According to the above aspect, there is no need for the control signal correction unit to stop operation for correcting the control signal, and thus, the control is simplified. Also, the correction coefficient does not change significantly when the relative distance changes from within to outside the usual range or from outside to within the usual range. Therefore, the amplitude of the canceling sound is prevented from changing discontinuously.

Preferably, the controller (23) further comprises a phase correction unit (35) configured to correct a phase of the control filter (31) based on the distance (L) when the distance (L) is not in the usual range (A-B).

According to the above aspect, the phase of the canceling sound also can be corrected, and therefore, the silencing effect at the ear position can be further enhanced.

Preferably, the control signal correction unit (32) corrects the control signal (u) based on an average value (Lav) of the distance (L) over a predetermined time.

If the control signal is corrected significantly when the head of the occupant is momentarily displaced due to shaking of the vehicle or the like, a delay in correction may lower the noise reduction effect. According to the above aspect, since the average value of the relative distance does not change significantly even if the head is momentarily displaced, the control signal can be prevented from being corrected significantly following the displacement. In other words, the control signal correction unit can correct the control signal appropriately by excluding small fluctuations.

According to the foregoing arrangement, it is possible to directly correct the control signal for noise cancellation in response to a change of the distance from the speaker to the occupant's ear, thereby to simplify the control and to quickly control the canceling sound following the change of the ear position.

DETAILED DESCRIPTION OF THE INVENTION

Figure 1:
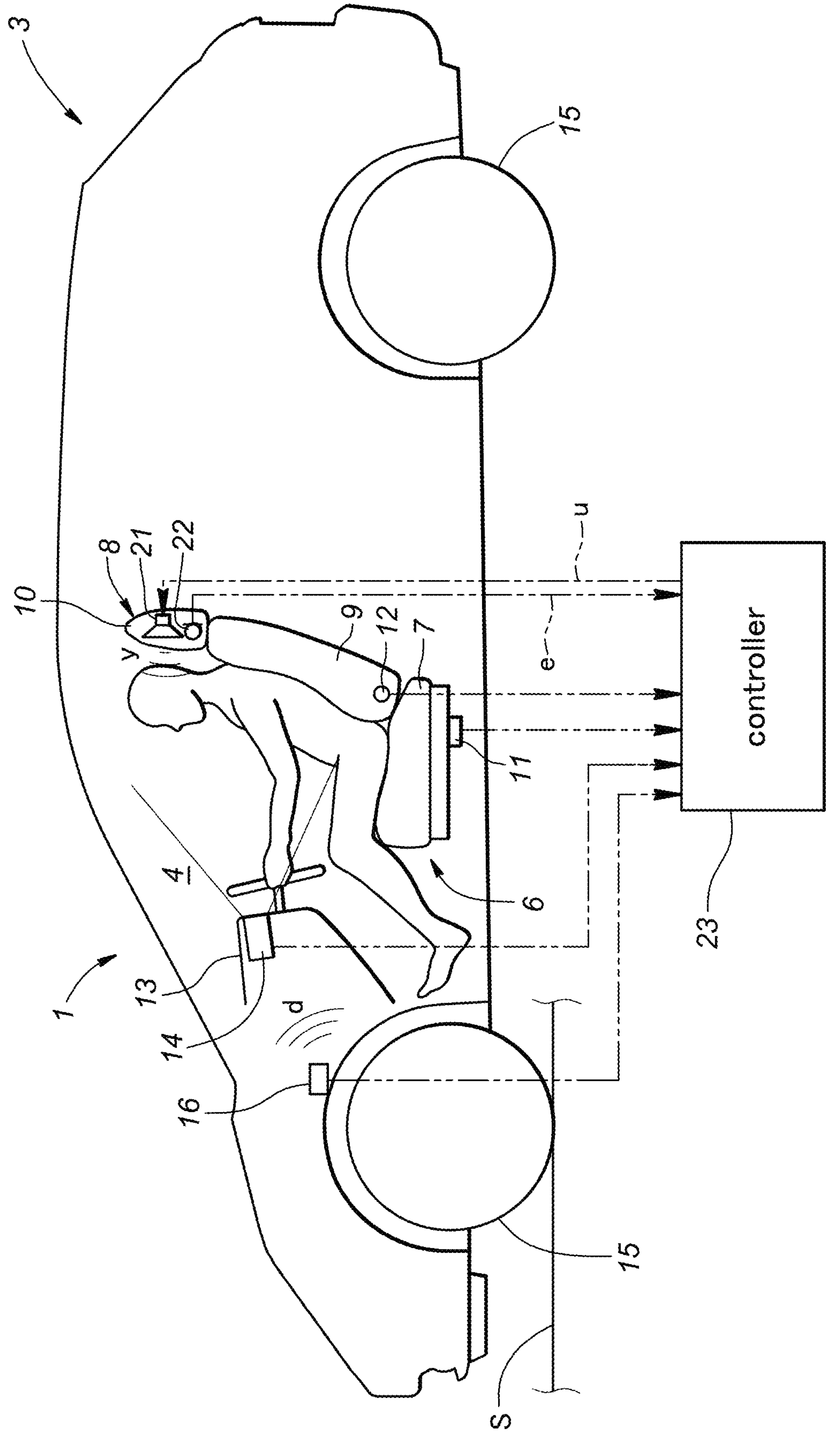
FIG. 1 is a schematic diagram showing a vehicle to which an on-vehicle sound control system according to an embodiment of the present invention is applied.

In the following, embodiments of the present invention will be described with reference to the drawings. Note that in the following description, "^" (circumflex) added to various symbols indicates an identified value or an estimated value. "^" is added above each symbol in the drawings, but is added after each symbol in the description.

<Vehicle 3>

FIG. 1 is a schematic diagram showing a vehicle 3 to which an on-vehicle sound control system (hereinafter may be simply referred to as "the sound control system 1") according to an embodiment is applied. The vehicle 3 is a four-wheeled automobile, for example.

In a vehicle cabin 4 of the vehicle 3, multiple occupant seats 6 are disposed. The multiple occupant seats 6 are arranged in the left-right and front-rear directions but FIG. 1 shows only one occupant seat 6 serving as the driver's seat. Each occupant seat 6 (hereinafter may be simply referred to as "the occupant seat 6") includes a seat cushion 7 and a reclining part 8 (backrest) connected to a rear portion of the seat cushion 7 to be pivotable with respect to the seat cushion 7. The reclining part 8 includes a seat back 9 and a headrest 10 fixed to the upper end of the seat back 9. In another embodiment, the headrest 10 may be slidably provided on the upper end of the seat back 9.

The vehicle 3 is provided with a front-rear position sensor 11 for detecting a front-rear position dsl of the seat cushion 7 in the vehicle 3. The front-rear position sensor 11 may be provided on the seat cushion 7. The seat cushion 7 is provided with a reclining angle sensor 12 for detecting a reclining angle $\theta_{re}$ of the reclining part 8 with respect to the seat cushion 7. The reclining angle sensor 12 may be provided on the reclining part 8.

In an instrument panel 13 of the vehicle 3, an infrared camera 14 is provided. The infrared camera 14 is disposed to face rearward to capture an image of the head of the occupant (the driver) seated in the driver's seat and the headrest 10. Preferably, the infrared camera 14 is disposed in front of the head of the occupant, and may be provided on the rear-view mirror, the sealed glass, the roof lining, or the like of the vehicle 3.

< Sound Control Apparatus 1 >

The sound control system 1 is an apparatus for controlling the sound inside the vehicle cabin 4 of the vehicle 3, and also functions as an active noise control device for reducing noise d generated inside the vehicle cabin 4. More specifically, the sound control system 1 reduces the noise d by generating canceling sound y that is in opposite phase with the noise d and making the generated canceling sound y interference with the noise d.

For example, the noise d to be reduced by the sound control system 1 is road noise caused by vibrations of wheels 15 due to the force from the road surface S. At a part of the vehicle 3 in the vicinity of each wheel 15, a vibration sensor 16 for detecting the vibration corresponding to the noise d is provided. The vibration sensor 16 outputs a reference signal r indicating the vibration corresponding to the noise d. Note that the noise d that may be reduced by the sound control system 1 may be noise other than the aforementioned road noise (for example, driving noise caused by the vibration of a driving source such as an internal combustion engine or an electric motor).

The sound control system 1 includes multiple speakers 21 (which are an example of a canceling sound output device and only one is shown in the drawings) configured to output the canceling sound y for canceling the noise d, and multiple error microphones 22 (only one is shown in the drawings) configured to generate an error signal e based on the noise d and the canceling sound y. Further, the sound control system 1 includes a controller 23 for controlling the multiple speakers 21 based on the error signal e.

< Speaker 21 >

Each speaker 21 (hereinafter may be simply referred to as "the speaker 21") is provided in a manner built into the headrest 10 of the reclining part 8 of the occupant seat 6. Two speakers 21 are disposed at positions corresponding to the left and right ears of the occupant seated in the occupant seat 6 (namely, the two speakers 21 are disposed to be located rearward of the respective ears). In another embodiment, the speakers 21 may be provided in a part of the reclining part 8 of the occupant seat 6 other than the headrest 10 (for example, in the seat back 9) or may be provided in a part of the occupant seat 6 other than the reclining part 8. Further, in another embodiment, the speakers 21 may be provided in a part of the vehicle 3 other than the occupant seat 6.

< Error Microphone 22 >

Each error microphone 22 (hereinafter may be simply referred to as "the error microphone 22") is provided in a manner built into the headrest 10 of the reclining part 8 of the occupant seat 6. Two error microphones 22 are disposed in positions corresponding to the left and right ears of the occupant seated in the occupant seat 6, for example, below and near the respective speakers 21. In another embodiment, the error microphones 22 may be provided in a part of the reclining part 8 of the occupant seat 6 other than the headrest 10 (for example, in the seat back 9) or may be provided in a part of the occupant seat 6 other than the reclining part 8. Further, in another embodiment, the error microphones 22 may be provided in a part of the vehicle 3 other than the occupant seat 6, such as the roof lining or the B pillar (not shown in the drawings), for example.

< Controller 23 >

The controller 23 is composed of a computer including an arithmetic processing unit (a processor such as a CPU, an MPU, etc.) and a storage device (a memory such as a ROM, a RAM, etc.). The controller 23 may be configured as one piece of hardware or may be configured as a unit including multiple pieces of hardware.

Figure 2:
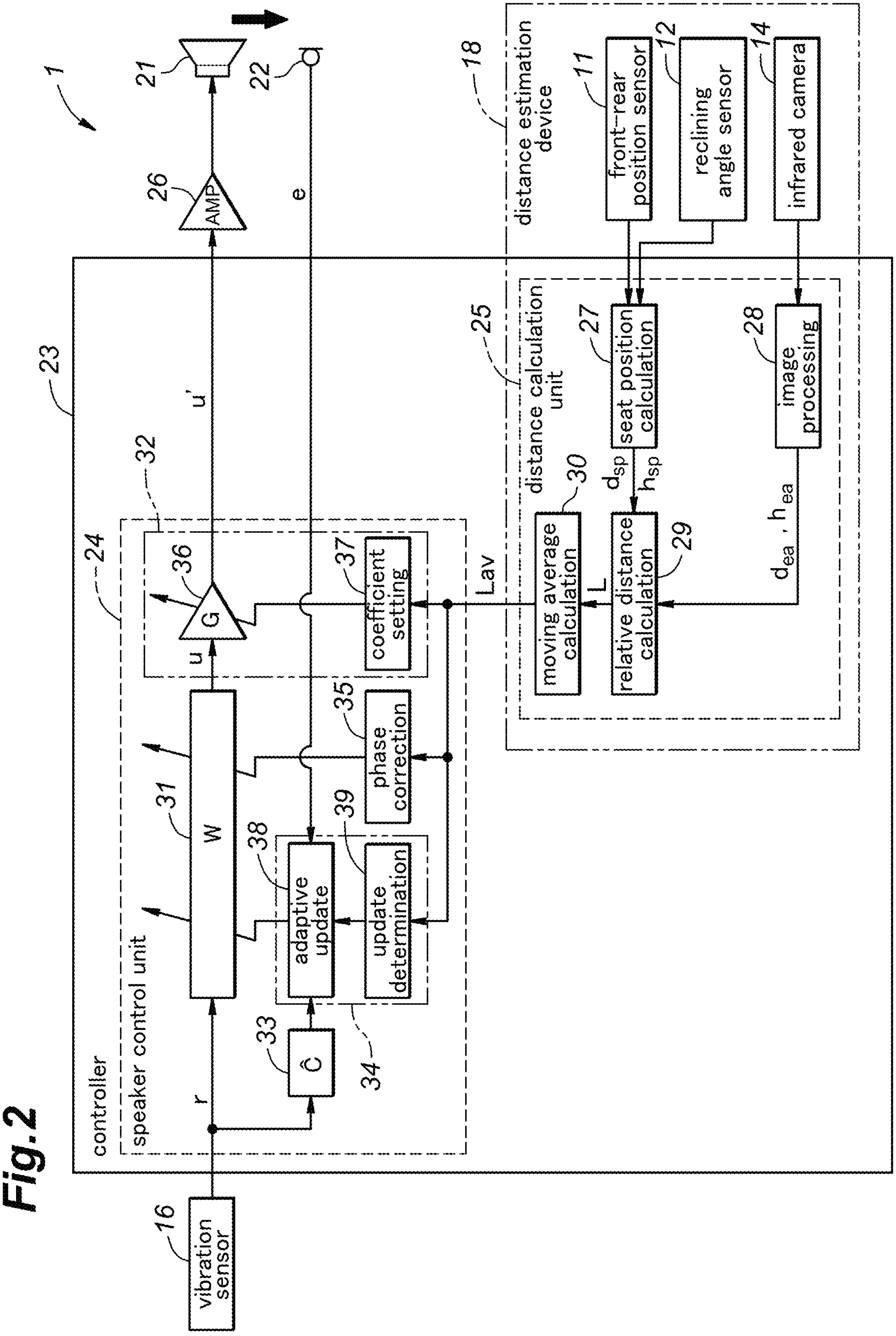
FIG. 2 is a functional block diagram showing the on-vehicle sound control system according to the embodiment.

With reference to FIG. 2, the controller 23 includes a speaker control unit 24 and a distance calculation unit 25 as functional components thereof. Though not shown in the drawings, the controller 23 includes the speaker control unit 24 for each speaker 21. The speaker control unit 24 generates a control signal u for the speaker 21 and drives the speaker 21 via an electric power amplifier 26. The distance calculation unit 25 constitutes computer hardware of a distance estimation device 18 that estimates the distance between each speaker 21 and the corresponding ear of the occupant (hereinafter may be referred to as the relative distance L). Note that the distance estimation device 18 is provided, as other pieces of hardware, with the front-rear position sensor 11, the reclining angle sensor 12, and the infrared camera 14 mentioned above.

In the following, detailed description will be first made of the distance calculation unit 25, and then of the speaker control unit 24.

< Distance Calculation Unit 25 >

The distance calculation unit 25 includes, as functional components thereof, a seat position calculation unit 27, an image processing unit 28, a relative distance calculation unit 29, and a moving average calculation unit 30.

< Seat Position Calculation Unit 27 >

Figure 3:
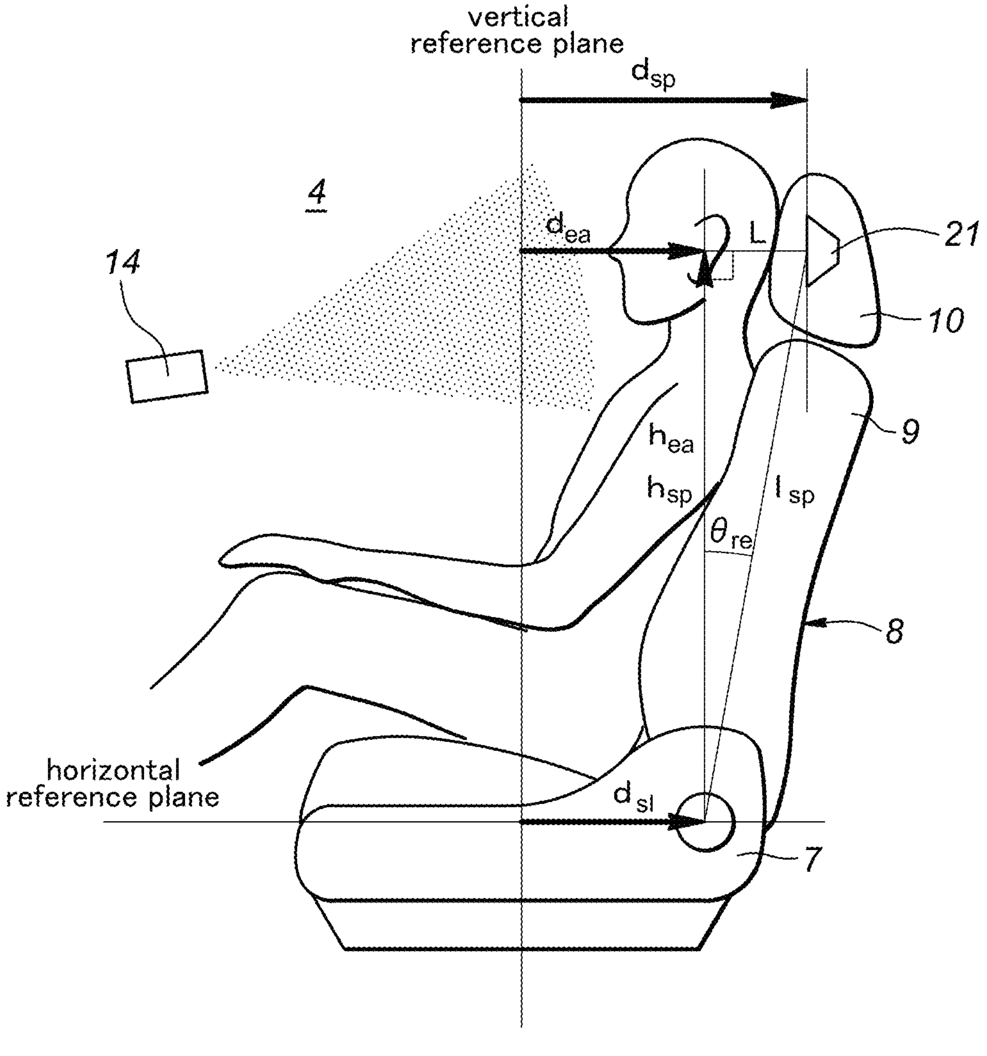
FIG. 3 is an explanatory diagram for explaining seat position calculation.

The seat position calculation unit 27 receives the front-rear position $d_{sl}$ of the seat cushion 7 outputted from the front-rear position sensor 11 and the reclining angle $\theta_{re}$ of the reclining part 8 outputted from the reclining angle sensor 12. As shown in FIG. 3, the front-rear position $d_{sl}$ represents the dimension from a vertical reference plane set in a predetermined front-rear position in the vehicle cabin 4 to the pivot axis of the reclining part 8 which is positioned rearward of the vertical reference plane. The reclining angle $\theta_{re}$ represents the angle between a vertical line passing the pivot axis of the reclining part 8 and a straight line connecting the speaker 21 which is positioned rearward of the vertical line and the pivot axis of the reclining part 8. The seat position calculation unit 27 calculates a front-rear position $d_{sp}$ of the speaker 21 by using the following formula (1). Note that the front-rear position $d_{sp}$ of the speaker 21 represents the distance from the vertical reference plane to the speaker 21 which is positioned rearward of the vertical reference plane.

$$d_{sp} = d_{sl} + l_{sp} \cdot \sin\theta_{re} \tag{1}$$

where $l_{sp}$ represents the distance from the pivot axis of the reclining part 8 to the speaker 21.

The seat position calculation unit 27 outputs the calculated front-rear position $d_{sp}$ of the speaker 21 to the relative distance calculation unit 29. Also, the seat position calculation unit 27 calculates a vertical position $h_{sp}$ of the speaker 21 and outputs the calculated vertical position $h_{sp}$ to the relative distance calculation unit 29. The seat position calculation unit 27 calculates the vertical position $h_{sp}$ of the speaker 21 by using the following formula (2). Note that the vertical position $h_{sp}$ of the speaker 21 represents the vertical distance from a horizontal reference plane passing the pivot axis of the reclining part 8 to the speaker 21 which is positioned above the horizontal reference plane.

$$h_{sp} = l_{sp} \cdot \cos\theta_{re} \quad (2)$$

< Image Processing Unit 28>

The image processing unit 28 performs image processing on the image captured by the infrared camera 14 by using known image processing technology and thereby calculates the head position and the head angle of the occupant. Also, the image processing unit 28 determines the positions of the left and right ears of the occupant by calculation based on the head position and the head angle of the occupant.

The position of each of the left and right ears is calculated as a front-rear position $d_{ea}$ representing the horizontal (rearward) distance from the aforementioned vertical reference plane to the ear and a vertical position $h_{ea}$ representing the vertical distance from the horizontal reference plane passing the pivot axis of the reclining part 8 to the ear. The image processing unit 28 outputs the calculated positions of the left and right ears of the occupant to the relative distance calculation unit 29.

< Relative Distance Calculation Unit 29>

With reference to FIG. 2, the relative distance calculation unit 29 calculates the relative distance L from each speaker 21 to the corresponding ear based on the front-rear position $d_{sp}$ and the vertical position $h_{sp}$ of the speaker 21 and the positions of the left and right ears of the occupant, which are inputted to the relative distance calculation unit 29. The relative distance calculation unit 29 outputs the calculated relative distance L to the moving average calculation unit 30. In the example of FIG. 3, the height position (the vertical position $h_{ea}$) of the occupant's ear substantially matches the height position (the vertical position $h_{sp}$) of the speaker 21, and the relative distance calculation unit 29 calculates the relative distance L by using the following formula (3).

$$L = d_{sp} - d_{ea} \quad (3)$$

< Moving Average Calculation Unit 30>

The moving average calculation unit 30 calculates an average value Lav of the relative distance L over a predetermined time based on the relative distance L inputted from the relative distance calculation unit 29. For example, the moving average calculation unit 30 calculates the average value Lav of the relative distance L by accumulating samples of the relative distance L inputted every predetermined computational processing cycle over one or 2 seconds, and dividing the accumulated value by the number of samples. The moving average calculation unit 30 outputs the calculated average value Lav of the relative distance L to the speaker control unit 24.

< Speaker Control Unit 24>

The speaker control unit 24 includes, as functional components thereof, a control signal generation unit 31, a control signal correction unit 32, a reference signal correction unit 33, an adaptive correction unit 34, and a phase correction unit 35. The control signal correction unit 32 includes a correction unit 36 and a coefficient setting unit 37. The adaptive correction unit 34 includes an adaptive update unit 38 and an update determination unit 39.

< Control Signal Generation Unit 31>

The control signal generation unit 31 of the controller 23 is composed of a control filter W. The control filter W is composed of a finite impulse response (FIR) filter, for example. In another embodiment, the control filter W may be composed of a single frequency adaptive notch (SAN) filter or the like.

The control signal generation unit 31 receives the reference signal r corresponding to the noise d from the vibration sensor 16. In another embodiment, instead of being generated by the vibration sensor 16, the reference signal r may be generated by a reference microphone (not shown in the drawings) configured to generate the reference signal r from the noise d, for example. Alternatively, the reference signal r may be inputted to the control signal generation unit 31 from a component other than the vibration sensor 16 and the reference microphone.

The control signal generation unit 31 generates a control signal u for controlling the speaker 21 by performing, with the control filter W, a filtering process on the reference signal r. The control filter W has a transfer function identified beforehand such that, when the occupant's ear is spaced from the speaker 21 to be within a normal distance range, the canceling sound y that reaches the occupant's ear from the speaker 21 has a phase that is 180° deferent from the phase of the noise d reaching the occupant and the same volume as the volume of the noise d reaching the occupant. The normal distance range will be described later. The control signal generation unit 31 outputs the generated control signal u to the control signal correction unit 32.

< Control Signal Correction Unit 32>

The control signal correction unit 32 of the controller 23 corrects the control signal u inputted from the control signal generation unit 31 based on the relative distance L from the speaker 21 to the occupant's ear, more accurately, based on the average value Lav of the relative distance L. Specifically, in the control signal correction unit 32, the correction unit 36 is composed of a multiplier and has a correction coefficient G. The correction unit 36 corrects the control signal u with the correction coefficient G, namely, by multiplying the control signal u by the correction coefficient G, and outputs a corrected control signal u'. The correction coefficient G is a sound volume coefficient of the canceling sound y to be generated by the speaker 21. In the following, the average value Lav of the relative distance L may be simply referred to as the relative distance L.

As the relative distance L between the speaker 21 and the occupant's ear becomes larger (as the ear leaves away from the speaker 21), the canceling sound y that reaches the ear from the speaker 21 becomes smaller. To address this, the correction unit 36 is provided with the correction coefficient G that becomes greater as the relative distance L becomes larger, and corrects the control signal u with the correction coefficient G. Thereby, the amplitude of the corrected control signal u' becomes larger as the relative distance L becomes larger. In this way, the correction unit 36 can prevent the reduction in the canceling sound y due to increase in the relative distance L with a simple method of correcting the control signal u with the variable correction coefficient G, and therefore, the memory capacity and the calculation amount of the controller 23 can be reduced compared to the case where multiple auxiliary filters are provided.

The correction unit 36 outputs the generated corrected control signal u' to the electric power amplifier 26. The electric power amplifier 26 supplies the electric power according to the corrected control signal u' to the speaker 21 and drives the speaker 21. Thereby, the speaker 21 generates the canceling sound y according to the corrected control signal u outputted from the control signal correction unit 32.

Figure 4:
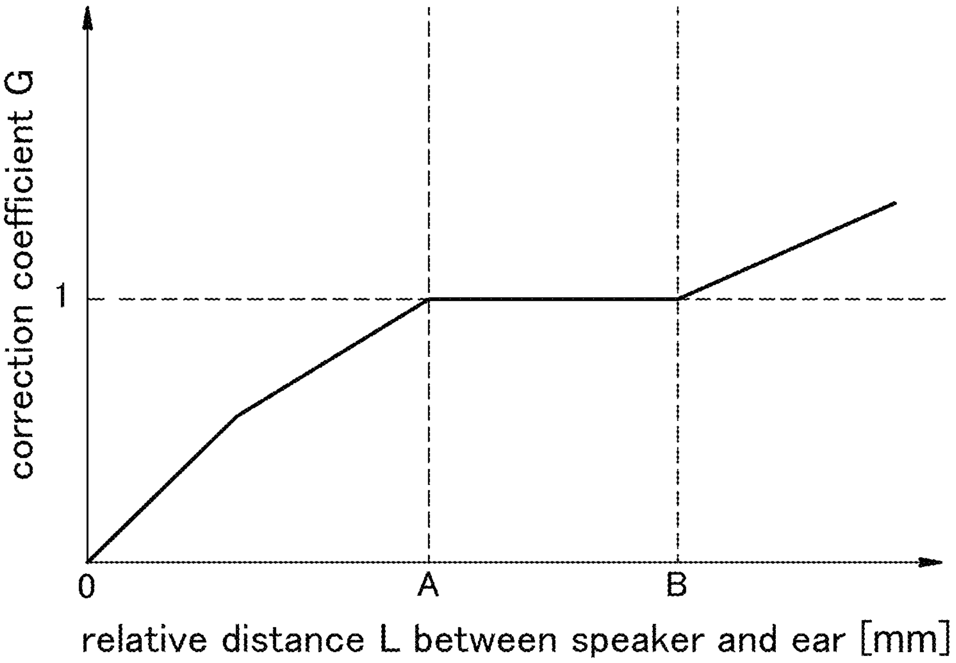
FIG. 4 is a correlation diagram of a relative distance and a correction coefficient.

The correction coefficient G of the correction unit 36 is set by the coefficient setting unit 37. The coefficient setting unit 37 sets the correction coefficient G such that the larger (the average value Lav of) the relative distance L from the speaker 21 to the occupant's ear becomes, the greater the correction coefficient G becomes (namely, the greater the amplitude of the corrected control signal u' becomes). Specifically, the coefficient setting unit 37 is provided with a gain map represented by a correlation diagram between the relative distance L and the correction coefficient G shown in FIG. 4. The coefficient setting unit 37 refers to this gain map and sets the correction coefficient G to the correction unit 36 according to the inputted relative distance L.

In this gain map, the correction coefficient G is set to monotonically increase with the increase of the relative distance L. Also, in a range from a first threshold A to a second threshold B for the relative distance L (hereinafter referred to as the usual range A-B), the correction coefficient G is set to 1. The usual range A-B is a normal range of the occupant's ear position spaced from the speaker 21. For example, the first threshold A may be 100 mm and the second threshold B may be 175 mm. The correction coefficient G when the relative distance L is 0 may be 0.1 or 0.2, for example.

With reference to FIG. 2 also, the coefficient setting unit 37 sets the correction coefficient G of the correction unit 36 to 1 when the ear is spaced from the speaker 21 to be within the normal distance range (when the relative distance L is in the usual range A-B). When the relative distance L is smaller than the first threshold A, the coefficient setting unit 37 sets the correction coefficient G of the correction unit 36 to a value less than 1. When the relative distance L is larger than the second threshold B, the coefficient setting unit 37 sets the correction coefficient G of the correction unit 36 to a value greater than 1.

Namely, when the relative distance L is in the usual range A-B, the coefficient setting unit 37 maintains the correction coefficient G to 1 and thus does not correct the control signal. Therefore, when the relative distance L is in the usual range A-B, the control signal correction unit 32 does not need to stop the operation of correcting the control signal u by the correction unit 36, whereby the control is simplified.

Also, since the correction coefficient G is set to monotonically increase with the increase of the relative distance L, the correction coefficient G does not change significantly when the relative distance L changes from within to outside the usual range A-B or from outside to within the usual range A-B. Therefore, the amplitude of the canceling sound y is prevented from changing discontinuously.

As described above, when the relative distance L is in the usual range A-B, the control signal correction unit 32 does not substantially correct the control signal u. The control signal correction unit 32 substantially corrects the control signal u only when the relative distance L is outside the usual range A-B, namely, only when the occupant's ear is spaced from the speaker 21 to be outside the normal distance range (to be in an abnormal distance range).

If the control signal u is corrected significantly when the head of the occupant is momentarily displaced due to shaking of the vehicle 3 or the like, a delay in correction may lower the effect of reducing the noise d. To address this problem, the control signal correction unit 32 corrects the control signal u based on the average value Lav of the relative distance L over a predetermined time, as described above. If the head is momentarily displaced, the average value Lav of the relative distance L does not change significantly. Therefore, the control signal u can be prevented from being corrected significantly following the displacement. In other words, the control signal correction unit 32 can correct the control signal u appropriately by excluding small fluctuations.

<Reference Signal Correction Unit 33>

The reference signal correction unit 33 is composed of a secondary path filter C^. The secondary path filter C^ is a filter indicating an estimated value of a transfer function of the secondary path from the speaker 21 to the error microphone 22. The secondary path filter C^ is composed of an FIR filter, for example. In another embodiment, the secondary path filter C^ may be composed of a SAN filter or the like.

The reference signal correction unit 33 generates a canceling sound estimation signal y^, which indicates an estimated value of the canceling sound y, by performing a filtering process on the reference signal r with the secondary path filter C^. The reference signal correction unit 33 outputs the generated canceling sound estimation signal y^ to the adaptive update unit 38 of the adaptive correction unit 34.

<Adaptive Correction Unit 34>

The adaptive update unit 38 of the adaptive correction unit 34 adaptively updates the control filter W constituting the control signal generation unit 31 by using an adaptive algorithm such as an LMS algorithm. More specifically, the adaptive update unit 38 adaptively updates the control filter W so as to minimize the error signal e outputted from the error microphone 22.

Figure 5:
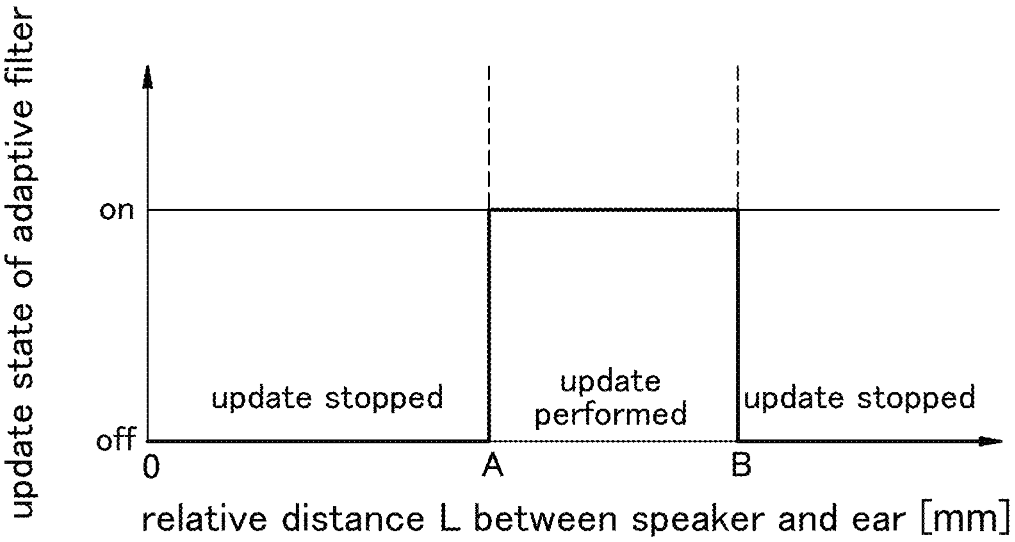
FIG. 5 is a correlation diagram of the relative distance an update state of an adaptive filter.

The update determination unit 39 of the adaptive correction unit 34 determines whether the update by the adaptive update unit 38 may be permitted based on the relative distance L between the speaker 21 and the ear. Specifically, as shown in FIG. 5, the update determination unit 39 determines that the adaptive update should be on (permitted or the update may be executed) when the relative distance L is in the usual range A-B from the first threshold A to the second threshold B. Otherwise, the update determination unit 39 determines that the adaptive update should be off (unpermitted or the update should be stopped). The update determination unit 39 outputs the determination result to the adaptive update unit 38.

The adaptive update unit 38 switches the execution/stop of the adaptive update of the control filter W according to the determination result of the update determination unit 39. The adaptive update unit 38 executes the adaptive update of the control filter W only when the determination result is permission. When the determination result is non-permission, the adaptive update unit 38 stops the adaptive update of the control filter W. While the adaptive update is stopped, the control filter W performs the filtering process on the reference signal r with the aforementioned transfer function identified beforehand.

The adaptive correction unit 34 updates the control filter W in the above-described manner. If the adaptive filter is updated when the head position of the occupant changes due to temporary change of the posture of the occupant by the shaking of the vehicle, it takes time for the adaptive filter to return to the original state by the update after the head returns to the usual position. In the present embodiment, since the update determination unit 39 determines, based on the relative distance L, whether the update may be permitted, learning due to unnecessary adaptive update is suppressed in cases such as when the occupant's ear position changes significantly. Also, since the controller 23 executes a simple control method of determining whether the update may be permitted based on the relative distance L and stopping/resuming the update according to the determination result, the memory capacity and the calculation amount of the controller 23 can be reduced compared to the case where the auxiliary filters are used.

<Phase Correction Unit 35>

The phase correction unit 35 of the controller 23 corrects the phase of the control filter W based on the relative distance L when the relative distance L is not in the usual range A-B. Namely, the phase correction unit 35 corrects the phase of the control filter W when the adaptive correction unit 34 stops the adaptive update of the control filter W. When the relative distance L is in the usual range A-B and the adaptive correction unit 34 is performing the adaptive update of the control filter W, the phase correction unit 35 does not correct the phase of the control filter W.

Figure 6:
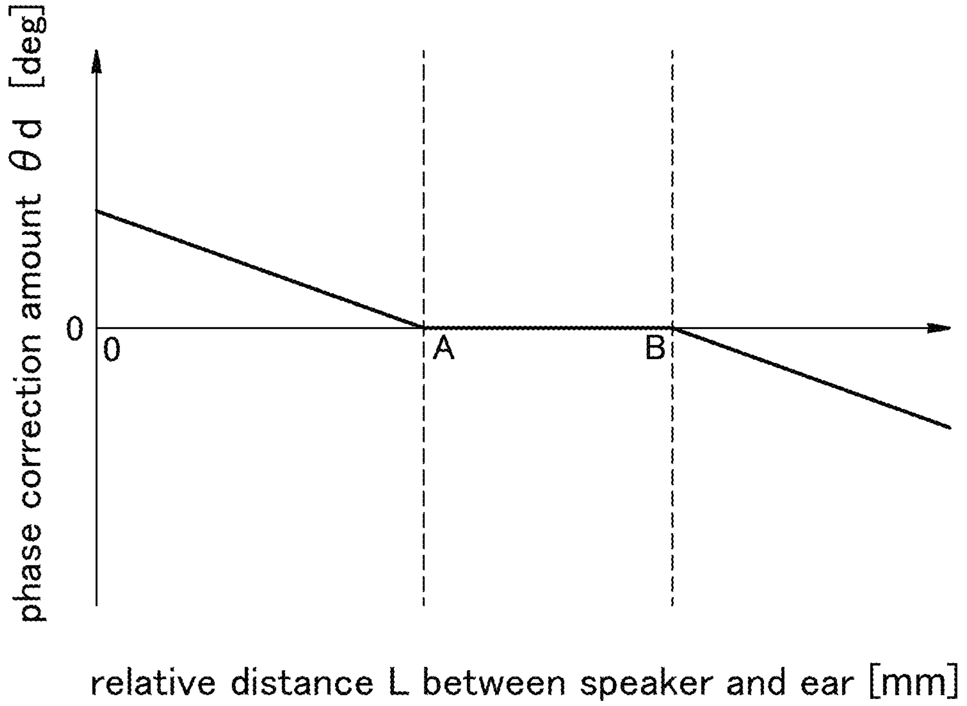
FIG. 6 is a correlation diagram of the relative distance and a phase correction amount.

Specifically, the phase correction unit 35 is provided with a phase correction amount map represented by a correlation diagram of between the relative distance L and the phase correction amount θd shown in FIG. 6. The phase correction unit 35 refers to this phase correction amount map and corrects the transfer function of the control filter W with the phase correction amount θd corresponding to the inputted relative distance L.

In this phase correction amount map, the phase correction amount θd is set to monotonically decrease with the increase of the relative distance L. Also, in the usual range A-B from the first threshold A to the second threshold B for the relative distance L, the phase correction amount θd is set to 0 deg. The usual range A-B is a normal range of the occupant's ear position as mentioned above. Thus, when the occupant's ear is positioned close to the speaker 21 to be outside the normal range, the phase of the transfer function of the control filter W is corrected to the positive (+) side (delayed side). When the occupant's ear is away from the speaker 21 to be outside the normal range, the phase of the transfer function of the control filter W is corrected to the negative (−) side (advanced side).

When the ear is spaced from the speaker 21 to be within the normal distance range (when the relative distance L is in the usual range A-B), the phase correction unit 35 sets the phase correction amount θd to 0 deg and hence does not correct the phase of the control filter W. When the relative distance L is not in the usual range A-B, the phase correction unit 35 corrects the phase of the control filter W based on the relative distance L. Thus, when the adaptive correction unit 34 is not adaptively updating the control filter W, the control signal correction unit 32 corrects not only the volume of the canceling sound y but also the phase of the canceling sound y, and therefore, the silencing effect at the ear position is enhanced.

The sound control system 1 according to the embodiment is configured as described above. Now, the effects of the sound control system 1 according to the embodiment will be described below.

In the embodiment, as described above, each occupant seat 6 is provided with two speakers 21 at positions corresponding to the occupant's ears, and the speaker control unit 24 is provided for each speaker 21. The control signal correction unit 32 of the controller 23 corrects the control signal u outputted from the control filter W based on the relative distance L so that the speaker 21 is controlled based on the corrected control signal u'. In other words, the control signal u is directly corrected based on the relative distance L from the speaker 21 to the occupant's ear. Therefore, the control is simple and the canceling sound y can be controlled quickly to follow the change of the occupant's ear position.

Figure 7:
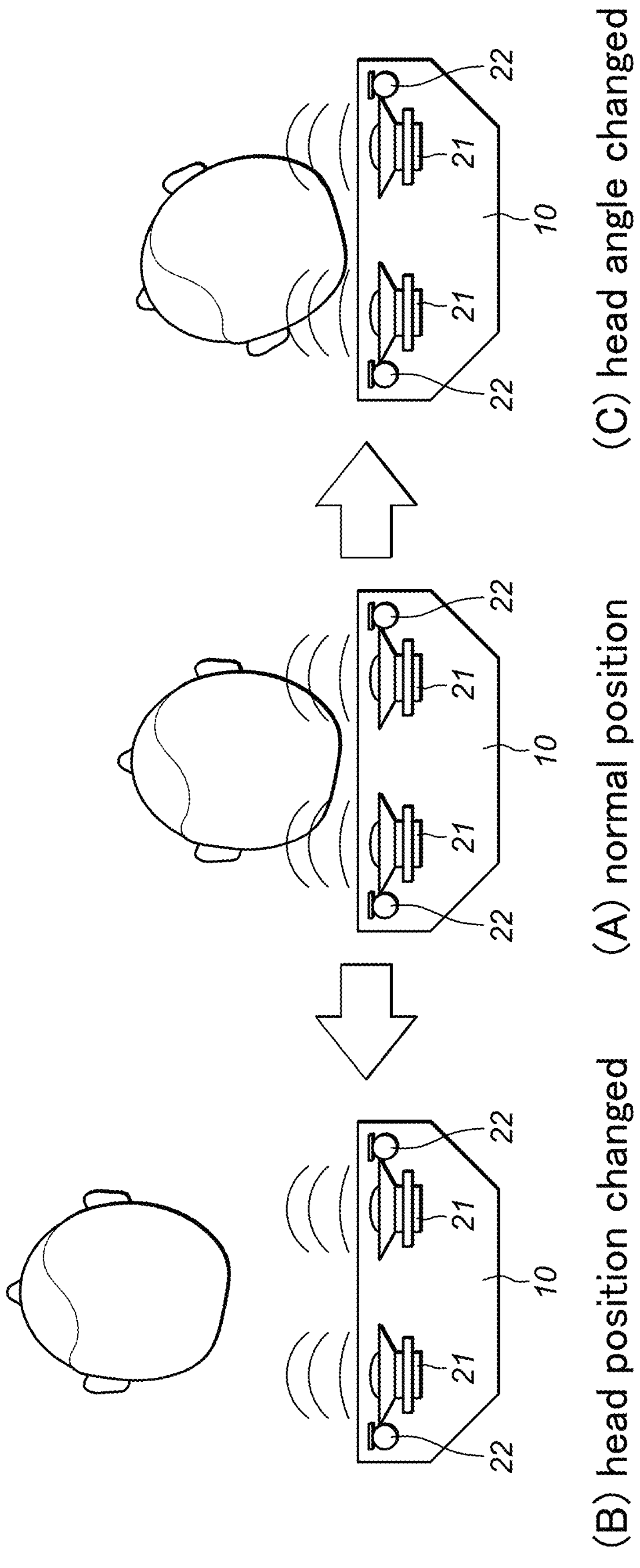
FIG. 7 is an explanatory diagram including schematic plan views for showing examples of the change of an occupant's ear position.

FIG. 7 is an explanatory diagram for showing examples of the change of the occupant's ear position, in which parts (A), (B), and (C) are schematic plan views respectively showing a state in which the head is in a normal position, a state in which the head position is changed, and a state in which the head angle is changed. The canceling sound y generated by the right speaker 21 is mainly transmitted to the right ear, and the canceling sound y generated by the left speaker 21 is mainly transmitted to the left ear.

As shown in part (A) of FIG. 7, when the relative distance L from each speaker 21 to the corresponding ear is in the usual range A-B, the adaptive update of the control filter W is permitted, and the adaptive update unit 38 of the controller 23 performs the update. Accordingly, the canceling sound y generated from the speaker 21 based on the control signal u filtered to minimize the error signal e. Thereby, the noise d is effectively canceled.

As shown in part (B) of FIG. 7, when the head of the occupant moves forward and the relative distance L from each speaker 21 to the corresponding ear becomes large to be out of the usual range A-B, the update determination unit 39 of the controller 23 determines that the adaptive update should be off (unpermitted). Accordingly, the adaptive update unit 38 stops the adaptive update of the control filter W. Instead, the phase correction unit 35 corrects the phase of the control filter W to the positive (+) side based on the relative distance L, and the control signal correction unit 32 corrects the control signal u with the correction coefficient G greater than 1. Thereby, the noise d is effectively canceled.

As shown in part (C) of FIG. 7, when the head of the occupant turns left, the relative distance L from the right speaker 21 to the right ear becomes large to be out of the usual range A-B, while the relative distance L from the left speaker 21 to the left ear becomes small to be out of the usual range A-B. In this case also, the update determination unit 39 of the controller 23 corresponding to each speaker 21 determines that the adaptive update should be off (unpermitted), and accordingly, each adaptive update unit 38 stops the adaptive update of the control filter W. The phase correction unit 35 for the right speaker 21 corrects the phase of the control filter W to the positive (+) side based on the relative distance L, and the control signal correction unit 32 for the right speaker 21 corrects the control signal u with the correction coefficient G greater than 1. The phase correction unit 35 for the left speaker 21 corrects the phase of the control filter W to the negative (−) side based on the relative distance L, and the control signal correction unit 32 for the left speaker 21 corrects the control signal u with the correction coefficient G less than 1. Thereby, the noise d is effectively canceled.

Figure 8:
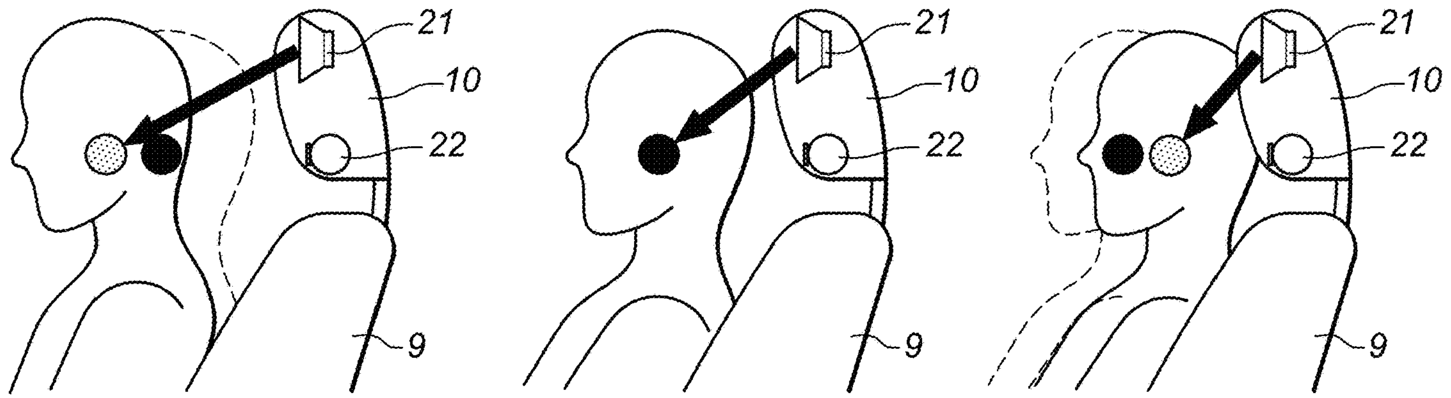
FIG. 8 is an explanatory diagram including schematic side views for showing other examples of the change of the occupant's ear position.

FIG. 8 is an explanatory diagram showing other examples of the change of the occupant's ear position, in which parts (A), (B), and (C) are schematic side views respectively showing a state in which the head is in a normal position, a state in which the head position is changed forward, and a state in which the head position is changed rearward. The canceling sound y generated by each speaker 21 is mainly transmitted to the ear on the corresponding side.

As shown in part (A) of FIG. 8, when the relative distance L from each speaker 21 to the corresponding ear is in the usual range A-B, the adaptive update of the control filter W is permitted, and the adaptive update unit 38 of the controller 23 performs the update. The acoustic characteristic of the canceling sound y generated from the speaker 21 at this time (the volume of the canceling sound y transmitted to the ear)

is a reference value for the noise d (same as the volume of the noise d transmitted to the ear). Also, the correction coefficient G is set to 1 which is a reference value. The noise d is effectively canceled by the canceling sound y.

As shown in part (B) of FIG. 8, when the head of the occupant moves forward, the relative distance L from each speaker 21 to the corresponding ear becomes large to be out of the usual range A-B. Consequently, the acoustic characteristic of the canceling sound y decreases. On the other hand, the correction coefficient G increases in accordance with the relative distance L to be greater than 1. Thereby, the noise d is effectively canceled.

As shown in part (C) of FIG. 8, when the head of the occupant moves rearward, the relative distance L from each speaker 21 to the corresponding ear becomes small to be out of the usual range A-B. Consequently, the acoustic characteristic of the canceling sound y increases. On the other hand, the correction coefficient G decreases in accordance with the relative distance L to be less than 1. Thereby, the noise d is effectively canceled.

Figure 9:
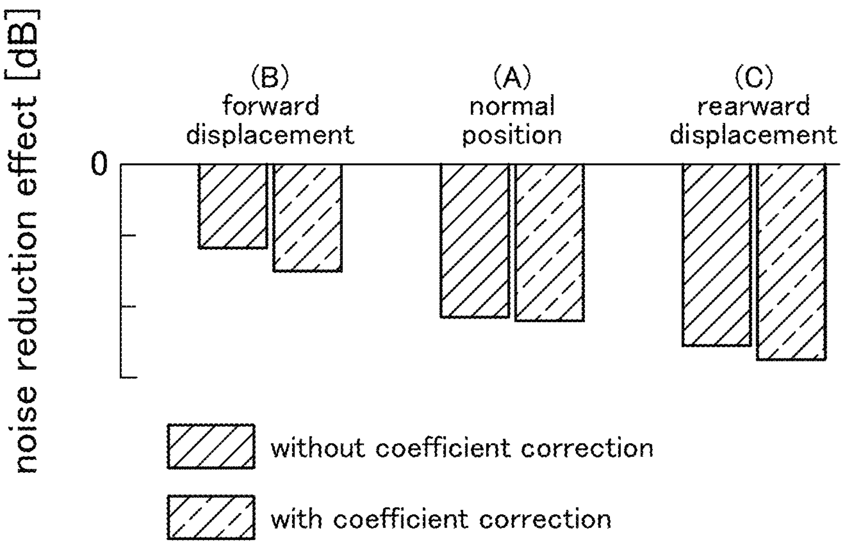
FIG. 9 is a graph showing a noise reduction effect when the ear position is changed as shown in FIG. 8.

FIG. 9 is a graph showing a noise reduction effect when the ear position is changed as shown in FIG. 8. As shown in part (A) of FIG. 9, when the head is in the normal position, increase in the noise reduction effect was not observed because, even though the correction using the correction coefficient G is performed, the correction coefficient G is set to 1. On the other hand, as shown in parts (B) and (C) of FIG. 9, in the state in which the head position is changed forward and in the state in which the head position is changed rearward, the correction using the correction coefficient G resulted in increase in the noise reduction effect compared to when the correction is not performed.

Incidentally, if the control signal correction unit 32 corrects the control signal u in accordance with the relative distance L during the adaptive update of the control filter W, convergence of the adaptive filter becomes slow. To avoid this, the control signal correction unit 32 shown in FIG. 2 corrects the control signal u only when the relative distance L is out of the usual range A-B and the update determination unit 39 does not permit the update. In other words, when the relative distance L is within the usual range A-B and the update determination unit 39 permits the update, the control signal correction unit 32 does not correct the control signal u. Therefore, convergence of the adaptive filter is fast, and the noise reduction effect is not reduced.

Concrete embodiments have been described in the foregoing, but the present invention can be modified in various ways without being limited to the above embodiments.

Figure 10:
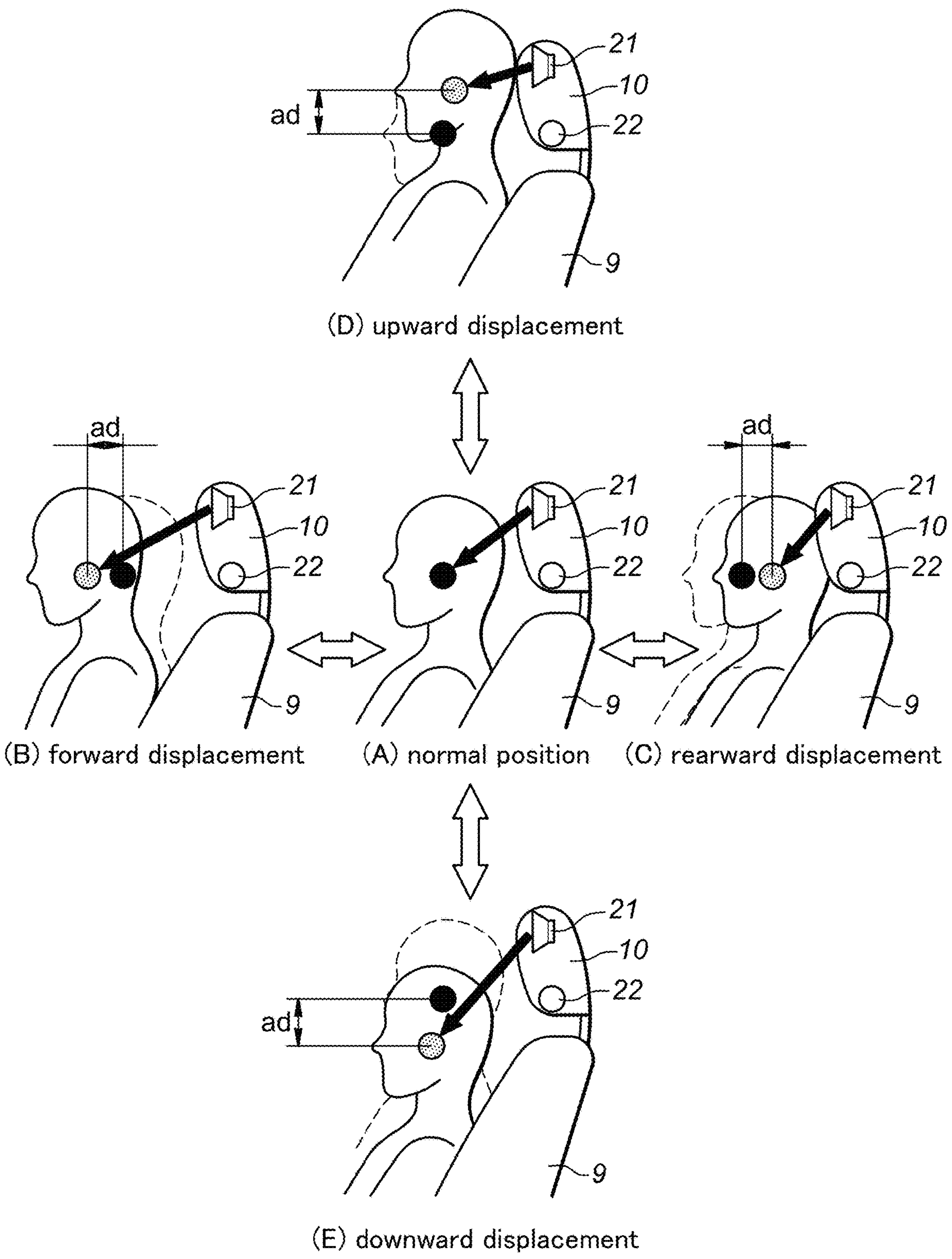
FIG. 10 is an explanatory diagram including schematic side views for showing other examples of the change of the occupant's ear position regarding another embodiment.

For example, as described above, the seat position calculation unit 27 calculates the vertical position hsp of speakers 21, and the image processing unit 28 calculates the vertical position hea of the left and right ears of the occupant. Therefore, the relative distance calculation unit 29 may calculate the relative distance L by taking into account the vertical distance between each speaker 21 and the corresponding ear of the occupant. FIG. 10 is an explanatory diagram showing other examples of the change of the occupant's ear position regarding another embodiment. In FIG. 10, part (A) shows a state in which the head of the occupant is in the normal position where the relative distance L from each speaker 21 to the corresponding ear is in the usual range A-B, and parts (B) to (E) respectively show states in which the head is moved forward, rearward, upward, and downward by a displacement amount ad. In each of the states shown in parts (B) to (E) of FIG. 10, the relative distance calculation unit 29 preferably calculates the relative distance L from each speaker 21 to the corresponding ear of the occupant by taking into account the vertical distance.

Besides, the concrete structure, arrangement, number, control procedure or the like of each member or part described in the above embodiments may be appropriately changed without departing from the spirit of the present invention. Also, not all of the components shown in the foregoing embodiments are necessarily indispensable and they may be selectively adopted as appropriate.

For example, though the speaker control unit 24 shown in FIG. 2 is provided with the reference signal correction unit 33, the adaptive correction unit 34, and the phase correction unit 35, the speaker control unit 24 may be configured to include none of them, may be configured not to include the reference signal correction unit 33 and the adaptive correction unit 34, or may be configured not to include the phase correction unit 35.

The invention claimed is:

1. An on-vehicle sound control system, comprising:

a speaker configured to output a canceling sound for canceling noise;

a controller configured to control the speaker; and a distance estimation device configured to estimate a distance between the speaker and an ear of an occupant, wherein the speaker is provided in a reclining part of an occupant seat, wherein the distance estimation device includes:

a front-back position sensor configured to detect a front-back position of the occupant seat;

a reclining angle sensor configured to detect a reclining angle of the reclining part;

a camera configured to capture an image of a head of the occupant;

a seat position calculation unit configured to calculate a position of the speaker based on the front-back position and the reclining angle;

an image processing unit configured to calculate a head position and a head angle of the occupant by performing image processing on the image captured by the camera, and determine a position of the ear of the occupant from the head position and the head angle; and a relative distance calculation unit configured to calculate a relative distance from the speaker to the ear based on the position of the speaker and the position of the ear, wherein the controller comprises a control filter configured to generate a control signal for controlling the speaker and a control signal correction unit configured to correct the control signal based on the relative distance and to output a corrected control signal, and the controller controls the speaker based on the corrected control signal.

2. The on-vehicle sound control system according to claim 1, wherein the control signal correction unit is provided with a correction coefficient such that the larger the distance is, the larger an amplitude of the corrected control signal becomes, and the control signal correction unit corrects the control signal with the correction coefficient.

3. The on-vehicle sound control system according to claim 1, further comprising an error microphone configured to generate an error signal from the noise and the canceling sound, wherein the controller further comprises an adaptive update unit configured to perform adaptive update of the control filter based on the error signal and an update determination unit configured to determine, based on the distance, whether the update by the adaptive update unit may be performed, and the adaptive update unit performs the update only when the update determination unit permits the update.

4. The on-vehicle sound control system according to claim 3, wherein the control signal correction unit corrects the control signal only when the update determination unit does not permit the update and does not correct the control signal when the update determination unit permits the update.

5. The on-vehicle sound control system according to claim 4, wherein the control signal correction unit corrects the control signal with a correction coefficient set depending on the distance, the update determination unit permits the update when the distance is in a predetermined usual range, and the control signal correction unit does not correct the control signal when the distance is in the usual range.

6. The on-vehicle sound control system according to claim 5, wherein the correction coefficient monotonically increases with an increase of the distance and is set to 1 when the distance is in the usual range, and the control signal correction unit does not correct the control signal by maintaining the correction coefficient to 1 when the distance is in the usual range.

7. The on-vehicle sound control system according to claim 5, wherein the controller further comprises a phase correction unit configured to correct a phase of the control filter based on the distance when the distance is not in the usual range.

8. The on-vehicle sound control system according to claim 1, wherein the control signal correction unit corrects the control signal based on an average value of the distance over a predetermined time.

9. The on-vehicle sound control system according to claim 1, wherein the seat position calculation unit is configured to calculate a front-back position and a vertical position of the speaker based on the front-back position and the reclining angle, wherein the image processing unit is configured to calculate a front-back position and a vertical position of the ear based on the head position and the head angle, and wherein the relative distance calculation unit is configured to calculate the relative distance based on the front-back position and the vertical position of the speaker and the front-back position and the vertical position of the ear.

* * * * *